(12) United States Patent
Faivre et al.

(10) Patent No.: US 8,924,094 B2
(45) Date of Patent: Dec. 30, 2014

(54) SYSTEM FOR WORK CYCLE DETECTION

(71) Applicant: Caterpillar Inc., Peoria, IL (US)

(72) Inventors: Joseph Faivre, Edelstein, IL (US); Yongliang Zhu, Dunlap, IL (US); Drew A. Fehr, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 13/653,954

(22) Filed: Oct. 17, 2012

(65) Prior Publication Data

US 2014/0107895 A1  Apr. 17, 2014

(51) Int. Cl.
E02F 3/43 (2006.01)
G01G 19/08 (2006.01)
E02F 9/20 (2006.01)

(52) U.S. Cl.
CPC ............ *E02F 9/2029* (2013.01); *G01G 19/083* (2013.01)
USPC ................... 701/50; 37/413; 37/419; 172/75; 172/465

(58) Field of Classification Search
CPC ........ A01B 79/005; E02F 9/2025; E02F 9/26; E02F 9/264; E02F 9/265; E02F 9/267; G06F 19/14
USPC .......... 701/50, 124; 37/413, 419; 172/75, 465
See application file for complete search history.

(56) References Cited

U.S. PATENT DOCUMENTS

| | | | |
|---|---|---|---|
| 5,659,470 A * | 8/1997 | Goska et al. ................. | 701/33.4 |
| 5,961,573 A * | 10/1999 | Hale et al. ....................... | 701/50 |
| 6,496,766 B1 * | 12/2002 | Bernold et al. ................. | 701/50 |
| 6,518,519 B1 | 2/2003 | Crane, III et al. | |
| 7,472,009 B2 * | 12/2008 | Baldwin ......................... | 701/50 |
| 7,574,821 B2 * | 8/2009 | Furem ............................. | 37/348 |
| 7,912,612 B2 | 3/2011 | Janardhan et al. | |
| 7,934,329 B2 * | 5/2011 | Mintah et al. ................... | 37/348 |
| 8,156,048 B2 * | 4/2012 | Mintah et al. ................... | 705/50 |
| 8,359,143 B2 * | 1/2013 | Colwell et al. .................. | 701/50 |
| 8,527,158 B2 * | 9/2013 | Faivre et al. .................... | 701/50 |
| 8,560,181 B2 * | 10/2013 | Ekvall et al. .................... | 701/50 |
| 8,560,183 B2 * | 10/2013 | Colwell et al. .................. | 701/50 |
| 2008/0097672 A1 * | 4/2008 | Clark et al. ..................... | 701/50 |
| 2008/0319710 A1 | 12/2008 | Hsu et al. | |
| 2009/0139119 A1 | 6/2009 | Janardhan et al. | |
| 2009/0143896 A1 | 6/2009 | Janardhan et al. | |
| 2009/0218112 A1 * | 9/2009 | Mintah et al. ..................... | 172/1 |
| 2009/0228177 A1 * | 9/2009 | Mintah et al. ................... | 701/50 |
| 2009/0319133 A1 * | 12/2009 | Ekvall et al. .................... | 701/50 |
| 2010/0076612 A1 * | 3/2010 | Robertson ..................... | 700/286 |
| 2010/0161184 A1 * | 6/2010 | Marathe et al. ................. | 701/50 |

(Continued)

FOREIGN PATENT DOCUMENTS

| | | | |
|---|---|---|---|
| JP | 07-259141 A | 10/1995 | |
| JP | 10-245874 A | 9/1998 | |

(Continued)

*Primary Examiner* — Mary Cheung
*Assistant Examiner* — Atul Trivedi
(74) *Attorney, Agent, or Firm* — Leydig, Voit & Mayer, Ltd.

(57) ABSTRACT

A payload control system includes a tool position sensor, a boom lift sensor, and a boom swing sensor. A controller is configured to determine a segment of a work cycle based upon the tool position, the boom lift, and the boom swing signal, and determine a payload moved by the tool during the segment of the work cycle.

16 Claims, 3 Drawing Sheets

(56) References Cited

U.S. PATENT DOCUMENTS

2011/0137491 A1* 6/2011 Self et al. ............................ 701/2
2012/0130599 A1* 5/2012 Faivre et al. ...................... 701/50
2012/0318539 A1* 12/2012 Joergensen et al. ............... 172/1
2013/0297155 A1* 11/2013 Ekvall et al. ..................... 701/50

FOREIGN PATENT DOCUMENTS

| JP | 2006-200251 A | 8/2006 |
| JP | 4172325 B2 | 10/2008 |
| WO | WO 2006/098645 A1 | 3/2006 |

* cited by examiner

SYSTEM FOR WORK CYCLE DETECTION

TECHNICAL FIELD

This disclosure relates generally to a payload control system and, more particularly, to a system for determining a segment of a work cycle for a payload estimation process.

BACKGROUND

Many different types of machines utilize work implements or tools to transfer material from a work site to another location, such as haul or transport vehicles. Examples of these machines include excavators, backhoes, loaders, and various other machines for moving dirt, gravel, stone, or other material. When loading a haul or transport vehicle, it may be desirable to monitor and record the amount of the material loaded onto the vehicle. Monitoring the payload may reduce the likelihood of overloading the vehicle.

One way to determine the total weight of the material loaded onto a haul vehicle is to automatically calculate or estimate the total payload delivered to the haul vehicle by the work tool of a machine such as an excavator or other material moving machine. One difficulty with some payload estimation processes is that they require an operator to move the implement or linkage of the material moving machine in a particular manner. In some situations, this may require an operator to focus on the manner in which the implement or linkage is being moved rather than the task of moving material from one location to another.

U.S. Pat. No. 7,912,612 discloses a payload calculation system for use with a work implement. The disclosed payload calculation system measures a state of a work implement and uses a processing device to calculate a mass of a payload moved by the work implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a payload monitoring system includes a tool position sensor system configured to provide a tool position signal indicative of a position of a tool, a boom lift sensor system configured to provide a boom lift signal indicative of a boom lifting velocity, and a boom swing sensor system configured to provide a boom swing signal indicative of a boom swinging velocity. A controller may be configured to receive the tool position signal, to receive the boom lift signal, and to receive the boom swing signal. The controller may further be configured to determine a segment of a work cycle of the tool based at least in part upon the tool position signal, the boom lift signal, and the boom swing signal, and to determine a payload moved by the tool during the segment of the work cycle.

In another aspect, a controller implemented method of determining a payload includes sensing a position of a tool, sensing a boom lifting velocity, and sensing a boom swinging velocity. The method also includes determining a segment of a work cycle of the tool based at least in part upon the position of the tool, the boom lifting velocity, and the boom swinging velocity, and determining a payload moved by the tool during the segment of the work cycle.

In yet another aspect, a machine includes a tool, a linkage pivotally connected to the tool, which linkage includes a boom. The machine further includes a tool position sensor system configured to provide a tool position signal indicative of a position of the tool, a boom lift sensor system configured to provide a boom lift signal indicative of a boom lifting velocity, and a boom swing sensor system configured to provide a boom swing signal indicative of a boom swinging velocity. A controller may be configured to receive the tool position signal, to receive the boom lift signal, and to receive the boom swing signal. The controller may further be configured to determine a segment of a work cycle of the tool based at least in part upon the tool position signal, the boom lift signal, and the boom swing signal, and to determine a payload moved by the tool during the segment of the work cycle.

DETAILED DESCRIPTION

Figure 1:
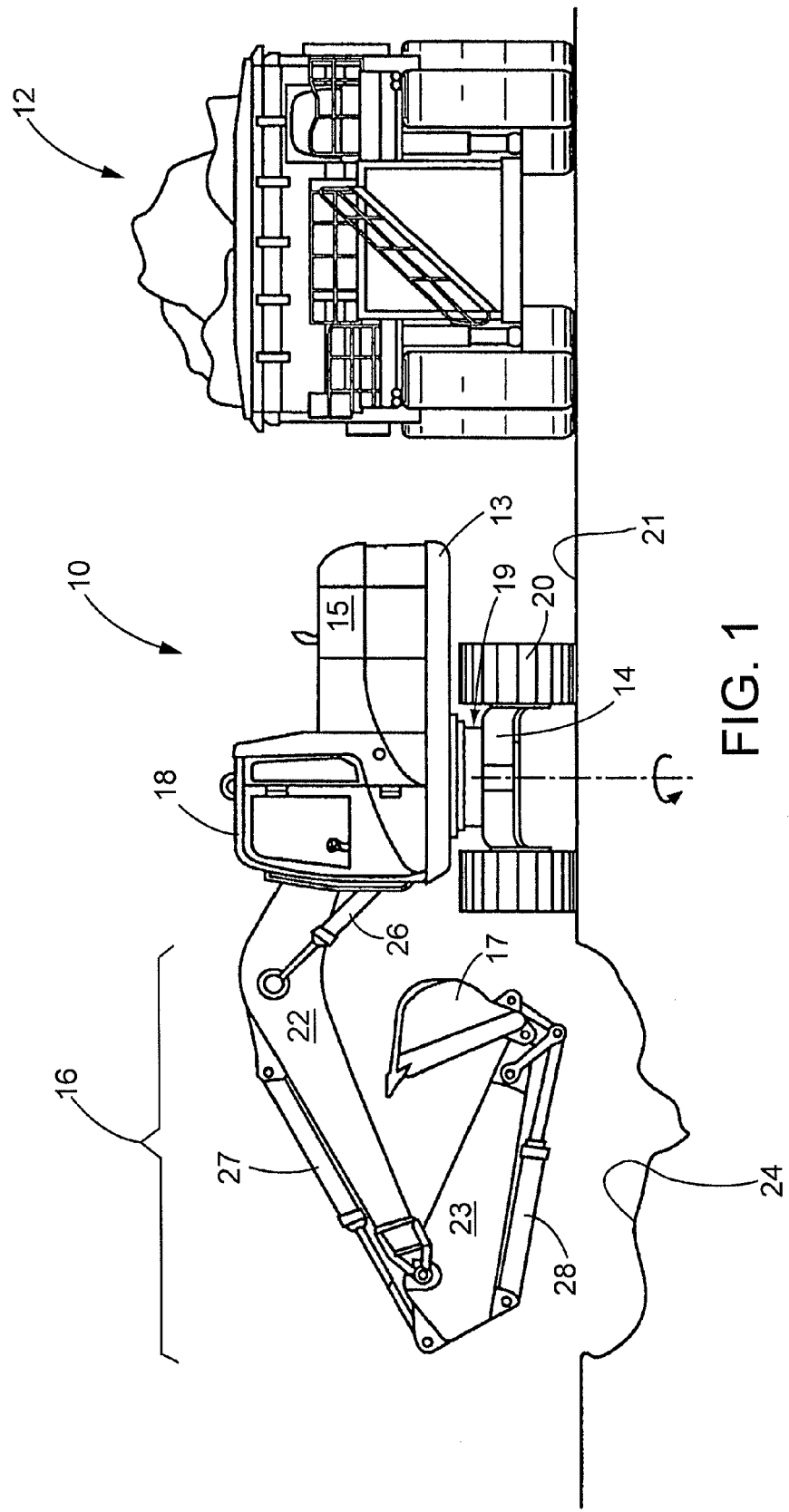
FIG. 1 is a side view of an excavator including a payload cycle detection system in accordance with the disclosure and with an adjacent target vehicle.

FIG. 1 illustrates an exemplary machine 10 such as an excavator having multiple systems and components that cooperate to perform an operation such as excavating earthen material from a dig site 24 and loading it onto a nearby target such as haul vehicle 12. Machine 10 may include a platform 13, an undercarriage 14, a prime mover 15, and an implement system 16 including a work implement or tool such as bucket 17. Other types of work implements may also be used.

Platform 13 may be rotatably disposed on undercarriage 14 and include an operator station 18 from which an operator may control the operation of machine 10. Rotation of platform 13 relative to undercarriage 14 may be effected by a swing motor 19.

Undercarriage 14 may be a structural support for one or more traction devices 20. Traction devices 20 may include one or more tracks configured to allow translational motion of machine 10 across a work surface 21. Alternatively, traction devices 20 may include wheels, belts, or other traction devices known in the art.

A prime mover 15 may provide power for the operation of machine 10. Prime mover 15 may embody a combustion engine, such as a diesel engine, a gasoline engine, a gaseous fuel powered engine (e.g., a natural gas engine), or any other type of combustion engine known in the art. Prime mover 15 may alternatively embody a non-combustion source of power, such as a fuel cell or a power storage device such as a battery coupled to a motor. Prime mover 15 may provide a rotational output to drive traction devices 20, thereby propelling machine 10. Prime mover 15 may also provide power to other systems and components of machine 10.

Implement system 16 may include one or more linkage members configured to move a load. In one example, the implement system may include a boom member 22 and a stick member 23, and a work implement or tool. A first end of boom member 22 may be pivotally connected to platform 13, and a second end of boom member 22 may be pivotally connected to a first end of stick member 23. The work implement or tool such as bucket 17 may be pivotally connected to a second end of stick member 23.

Each linkage member may include and be operatively connected to one or more actuators such as hydraulic cylinders. More specifically, boom member 22 may be propelled or moved along a path by one or more boom hydraulic cylinders 26 (only one being shown in FIG. 1). Stick member 23 may be propelled by a stick hydraulic cylinder 27. Rotation of the bucket 17 relative to the stick member 23 may be effected by a work implement hydraulic cylinder 28. The linkage members may translate or rotate in a plane that is generally orthogonal to the work surface 21.

Figure 2:
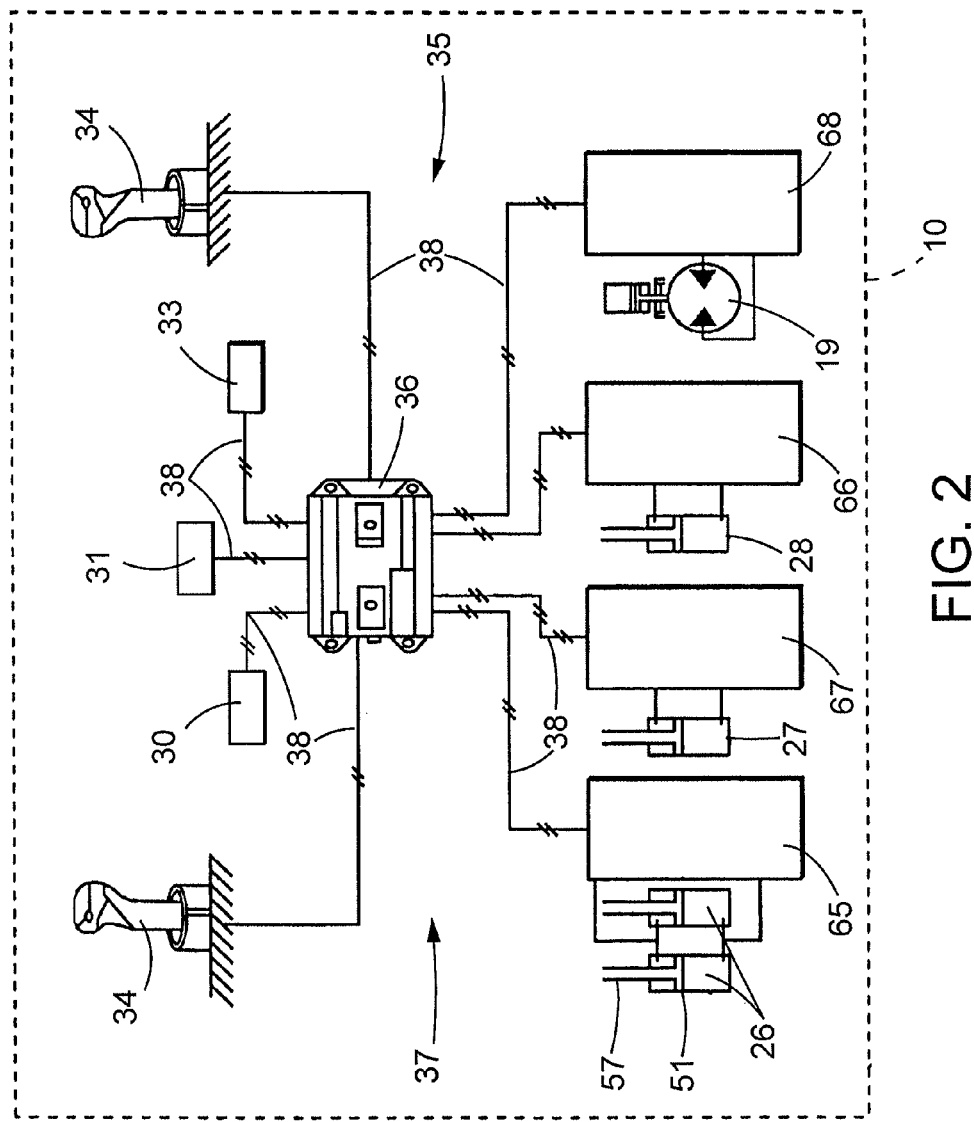
FIG. 2 is a simplified schematic of a control system within the excavator of FIG. 1.

Each of the boom hydraulic cylinders 26, stick hydraulic cylinder 27, and work implement hydraulic cylinder 28 may embody a linear actuator as depicted in FIG. 2 having a tubular or cylindrical body 51 and a piston and rod assembly 57 therein arranged to form two distinct pressure chambers. The pressure chambers may be selectively supplied with pressurized fluid and drained of the pressurized fluid to cause the piston and rod assembly 57 to displace within the cylindrical body 51, and thereby change the effective length of the hydraulic cylinders. The flow rate of fluid into and out of the pressure chambers may relate to the speed of extension or retraction of hydraulic cylinders 26, 27, 28, while a pressure differential between the two pressure chambers may relate to the force imparted by the hydraulic cylinders to their associated linkage members. The extension and retraction of the hydraulic cylinders results in the movement of bucket 17. It is also contemplated that the actuators may alternatively embody electric motors, pneumatic motors, or any other actuation devices.

Swing motor 19 may also be driven by differential fluid pressure. Specifically, swing motor 19 may be a rotary actuator including first and second chambers (not shown) located on opposite sides of an impeller (not shown). Upon filling the first chamber with pressurized fluid and draining the second chamber of fluid, the impeller is urged to rotate in a first direction. Conversely, when the first chamber is drained of fluid and the second chamber is filled with pressurized fluid, the impeller is urged to rotate in an opposite direction. The flow rate of fluid into and out of the first and second chambers affects the rotational speed of swing motor 19, while a pressure differential across the impeller affects the output torque thereof.

Machine 10 may be equipped with a plurality of sensors that provide data, directly or indirectly, of the performance or conditions of various aspects of the machine. Angle sensors 30 (FIG. 2) may be located near one or more joints of the linkage members (i.e., the joint between platform 13 and boom member 22, the joint between boom member 22 and stick member 23, the joint between the work implement and stick member 23), and between platform 13 and undercarriage 14. Angle sensors 30 may include rotary encoders, potentiometers, or other angle or sensing devices for measuring the relative angular position of components. In an alternate embodiment, angle sensors 30 may measure the displacement of an actuator and the joint angles may be calculated based upon the position of the actuators and the dimensions of the linkage members. Output signals of angle sensors 30 may be used to determine the state of aspects of machine 10, including implement system 16, such as, for example, the position, the velocity, the acceleration, the angle, the angular velocity, and the angular acceleration of each linkage member, and the angle, the angular velocity, and the angular acceleration of the platform 13 relative to undercarriage 14. In another alternate embodiment, sensors (not shown) for determining the velocity and/or acceleration of the components (e.g., an angle rate sensor) may be substituted for or provided in addition to angle sensors 30.

Force sensors 31 may be configured to output a signal usable to determine a force created or experienced by the actuators and/or the linkage members. For example, a force sensor may embody a pressure sensor system including pressure sensors located and configured to measure the pressure of the pressurized fluid within or supplied to one or both of the pressure chambers of the boom hydraulic cylinders 26. The measured pressures may be used to determine the force generated by each actuator. The forces together with the physical dimensions of the actuators and linkage members may be used to determine joint torques of the linkage members. Force sensors 31 may alternatively embody strain gauges, piezoelectric transducers, or other force sensing devices located at linkage joints, actuator joints, or any other appropriate location.

Attitude sensor 33 may measure the pitch and roll of machine 10. Attitude sensor 33 may be located at any appropriate location on machine 10, such as, for example, at operator station 18. Attitude sensor 33 may embody one or more gyroscopes, accelerometers, gravitational inclinometers, or any combination thereof.

A control system 35 may be provided to control the operation of the machine 10 including the payload calculation system of the machine. The control system 35, as shown generally in FIG. 2, may include an electronic control module such as controller 36. The controller 36 may receive operator input command signals and control the operation of the various systems of the machine 10. The control system 35 may include one or more operator input devices 34 such as a joystick to control the machine 10 and one or more sensors. The term "sensor" is meant to be used in its broadest sense to include one or more sensors and related components that may be associated with the machine 10 and that may cooperate to sense various functions, operations, and operating characteristics of the machine. The sensors of machine 10 may include a plurality of angle sensors 30, force sensors 31, and attitude sensors 33 (each of which is shown generally in FIG. 2) to provide data and other signals representative of various operating parameters of the machine 10. The controller 36 may communicate with the one or more sensors and the one or more operator input devices 34 via communication lines 38 or wirelessly.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions of the machine 10 that may be stored in the memory of controller. Each of these maps may include a collection of data in the form of tables, graphs, and/or equations. The controller 36 may use the data maps to maximize the performance and efficiency of the machine 10.

The boom hydraulic cylinders 26, the stick hydraulic cylinder 27, the work implement hydraulic cylinder 28, and the swing motor 19 may function together with other cooperating fluid components to move bucket 17 in response to input received from the operator input device 34. In particular, control system 35 may include one or more fluid circuits (not shown) configured to produce and distribute streams of pressurized fluid. A boom control valve 65, a stick control valve 66, a bucket control valve 67, and a swing control valve 68 may be situated to receive the streams of pressurized fluid and selectively meter the fluid to and from the boom hydraulic cylinders 26, the stick hydraulic cylinder 27, the work implement hydraulic cylinder 28, and the swing motor 19, respectively, to regulate the motions thereof.

Controller 36 may be configured to receive input from the operator input device 34 and to command operation of the boom control valve 65, the stick control valve 66, the bucket control valve 67, and the swing control valve 68 in response to the input and based on the data maps described above. Specifically, controller 36 may receive the input device position signal indicative of a desired speed and/or force of bucket 17 in a particular direction, and reference the selected and/or modified data maps stored in the memory of controller 36 to determine flow rate values and/or associated positions for each of the supply and drain elements within the boom control valve 65, the stick control valve 66, the bucket control valve 67, and the swing control valve 68. The flow rates or positions may then be commanded of the appropriate supply and drain elements to cause filling and/or draining of the chambers of the actuators at rates that result in the desired movement of bucket 17.

In operation, a typical work cycle for machine 10 may be divided into four relatively distinct segments. In a first or dig segment, an operator maneuvers the implement system 16 including bucket 17 at a dig site 24 to load the bucket. During such operation, the operator may use the bucket 17 to manipulate the material to optimize the digging operation. In a second or swing-to-dump segment, the implement system 16 is moved with a loaded bucket 17 from the dig site 24 to be aligned with a desired dump site. In one example, such a desired dump site may be haul vehicle 12 (FIG. 1). In a third or dump segment, the implement system 16 including bucket 17 are moved to empty or dump the bucket. In a fourth or swing-to-trench segment, the implement system 16 including bucket 17 is returned to the dig site 24 at which another digging operation or work cycle may begin.

In some situations, it is desirable to measure or calculate the amount of material moved by the machine during each work cycle. Control system 35 may include a payload control system 37 to calculate or estimate the payload moved within the bucket 17 during each work cycle. The payload control system 37 may utilize various operating conditions or the state of the machine 10 together with various parameters of the machine to calculate the payload. Such operating conditions may include the positions, velocities, accelerations, and orientations of the linkage members of the implement system 16 and the platform 13. The parameters may include the masses and inertias of the linkage members of the implement system 16 and the platform 13. Depending on the complexity of the payload control system 37, greater or fewer operating conditions and parameters may be used when calculating the payload.

Figure 3:
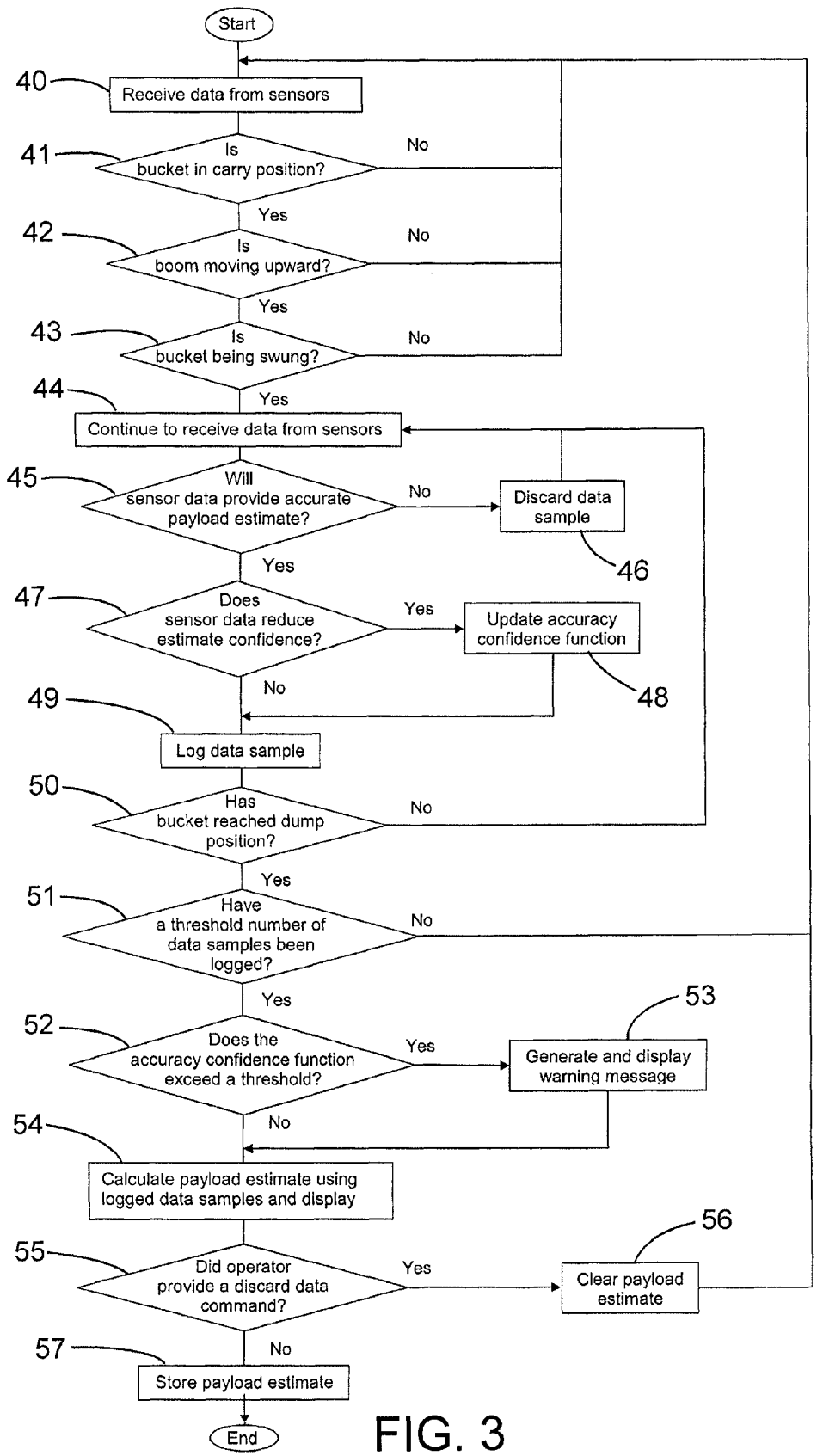
FIG. 3 is a flowchart illustrating a payload estimation process in accordance with the disclosure.

The payload control system 37 may include a system for automatically controlling the payload calculation process. FIG. 3 depicts a flowchart of such an automatic payload calculation process. At stage 40, the controller 36 receives data from various sensors that may be used to determine the state of the implement system 16. More specifically, the controller 36 may receive data from the various angle sensors 30 associated with each of the joints of the linkage members as well as data from the attitude sensor 33 that provides data indicative of the pitch and roll of machine 10. In addition, the controller 36 may also receive data from the force sensors 31 that may be used to determine the force created or experienced by the actuators and/or the linkage members. The data from the sensors may be used as input for different aspects of the payload control system. As described in more detail below, some aspects of the signals from the sensors may be used as input or data to determine when to start and stop the automatic payload calculation process and other aspects of the signals may be used as input or data samples by the payload control system to calculate the estimated payload.

At decision stage 41, the controller 36 may use the data from the angle sensors 30 and the attitude sensor 33 to determine whether the bucket 17 is in a tool carry position (i.e., a position at which material within the bucket 17 will not readily spill). These sensors and, in some embodiments, other sensors function as a tool position sensor system that provides a tool position signal indicative of the tool position. The controller 36 may determine whether the bucket 17 is in a tool carry position by comparing the data maps of the controller 36 to positions of the linkage members and the attitude of the machine 10. More specifically, the position of the boom member 22 relative to the platform 13, the position of the stick member 23 relative to the boom member 22, and the bucket 17 relative to the stick member 23 define a position and orientation of the bucket relative to the platform 13. The pitch and roll of the machine 10 together with the position of the bucket 17 relative to the platform 13 may be used by the controller 36 to determine the position of the bucket relative to a gravity reference. The position of the bucket relative to a gravity reference is sometimes referred to as the "world position" of the bucket 17. If the bucket is not in a tool carry position at decision stage 41, the controller 36 will continue at stage 40 to receive data from the sensors and the automatic payload calculation process will not begin.

If the bucket 17 is in a tool carry position, the controller 36 may determine at decision stage 42 whether the boom member 22 is moving upward. A boom lift sensor system, which may include angle sensors 30 and other types of sensors, may provide a boom lift signal indicative of the behavior of the boom member 22. For example, the boom lift sensor system may provide a boom lifting velocity signal. The controller 36 may use data received from the boom lift sensor system including the angle sensors 30 to compare the data to data maps within the controller 36 to determine whether the boom member 22 is moving upward. In an alternate process, the controller 36 may require the boom member 22 to be moving upward at a rate greater than a predetermined rate or value rather than merely moving upward. If the boom member 22 is not moving upward, the controller 36 may continue to receive data at stage 40 from the sensors.

If the boom member 22 is moving upward, the controller 36 may determine, at decision stage 43, whether the bucket 17 is being swung by comparing the data received from the sensors to data maps within the controller 36. In doing so, the controller 36 may receive data from an angle sensor 30 that measures the relative position between the platform 13 and the undercarriage 14. The angle sensors 30 and, in certain embodiments, other sensors, may make up a boom swing sensor system that may provide a boom swing signal indicative of the behavior of the boom member 22. For example, the boom swing sensor system may provide a signal indicative of a boom swinging velocity. In an alternate process, the controller 36 may require that the bucket 17 be swung at a rate greater than a predetermined rate or value rather than merely being swung. If the bucket 17 is not being swung, the controller 36 may continue to receive data at stage 40 from the sensors. Thus, if the bucket 17 is in the tool carry position (stage 41), the boom member 22 is moving upwards (stage 42) and is being swung (stage 42), the controller 36 may begin to calculate automatically the payload within the bucket 17. In doing so, the controller continues to receive data from the sensors at stage 44.

At decision stage 45, the controller 36 may be configured to analyze data from the various sensors to determine whether the operating characteristics of machine 10 are such that an accurate determination of the payload within the bucket 17 may be determined. In one example, the controller 36 may be configured to determine a boom lifting acceleration indicative of the lifting acceleration of the boom member 22. The boom lifting acceleration may be determined from an angle sensor 30 associated with the joint between the platform 13 and boom member 22. If the boom lifting acceleration is greater than a predetermined rate, the controller 36 may determine that a calculation of the payload within the bucket 17 will not be sufficiently accurate and discard at stage 46 the data sample received at stage 40.

In another example, the controller 36 may be configured to determine whether a boom swinging acceleration indicative of the swinging acceleration of boom member 22 exceeds a predetermined rate. The boom swinging acceleration may be determined by an angle sensor 30 configured to determine the position of the platform 13 relative to undercarriage 14. If the boom swinging acceleration exceeds a predetermined rate, the controller may discard the data sample at stage 46. In still another example, the controller 36 may be configured to determine a boom angle indicative of an angle of the boom member 22. The controller 36 may compare the boom angle to a data map within the controller to determine whether the boom angle exceeds a predetermined angle. If the boom angle exceeds the predetermined angle, the controller 36 may discard the data sample at stage 46. Additional operating characteristics of machine 10 may alternatively or additionally be analyzed at stage 45 to determine whether the data provides sufficient confidence for the calculation of the payload.

If the data sample has been discarded at stage 46, the controller 36 continues to receive data at stage 44 from the sensors. The operating characteristics of the machine 10 may continue to be monitored at decision stage 45 until the operating conditions of the machine 10 indicate that the data is likely to provide an accurate payload estimate.

If the data sample is likely to provide an accurate payload estimate at decision stage 45, the controller 36 may be configured to determine at decision stage 47 a degree of confidence in the payload estimate. In one example, the operator may be manipulating the implement system 16 in a manner that may negatively affect the accuracy of the payload calculation process (e.g., moving the bucket 17 in a "jerky" manner). Accordingly, the controller 36 may monitor the acceleration of the boom member 22 relative to the platform 13, the movement of the stick member 23 relative to the boom member 22, and the bucket 17 relative to the stick member 23. If any of these components accelerate at a rate greater than desired, the controller 36 may update at stage 48 an accuracy confidence function within the controller. The accuracy confidence function may maintain a log of instances in which movement of the implement system 16 or other aspects of the machine 10 has reduced the confidence in the accuracy of the payload calculation process. If the number of reduced confidence instances (i.e., those in which the accuracy of the payload calculation process may be reduced) exceeds a predetermined number, the controller 36 may generate a warning at stage 53 to alert the operator of the reduction in confidence of the payload calculation.

In another example, the controller 36 may monitor the pitch angle velocity and acceleration as well as the roll angle velocity and acceleration of the machine 10. If any of those rates exceed a predetermined value, the controller 36 may update the accuracy confidence function at stage 48. Still further, the controller 36 may also monitor the world angle of the bucket 17 and update the accuracy confidence function at stage 48 if the world bucket angle exceeds a predetermined angle. Alternatively, other operating characteristics of the machine 10 may be monitored at stage 47 to determine whether the confidence in the payload estimation may be improved upon.

If desired, controller 36 may be configured to display a warning message when the operator is moving the implement system 16 or machine 10 in a manner that negatively affects the accuracy of the payload calculation process. In such case, the operator may note the warning message and subsequently change the manner in which the implement system 16 or other aspects of machine 10 is being manipulated to obtain payload estimates with higher confidence in accuracy.

At stage 49, the controller 36 may store or log the data sample that may be used in the payload calculation process. In one configuration, the controller 36 may only store a predetermined number of data samples for a particular swing-to-dump segment. In such case, once a sufficient number of data samples have been stored within the controller 36, the controller may discard the oldest data sample as each new data sample is received. In another configuration, the controller 36 may store all of the data samples as they are collected.

At decision stage 50, the controller 36 may determine whether the bucket 17 has reached its dump position or whether the bucket is still moving within the "swing-to-dump" segment of the work cycle. In one example, the controller 36 may determine whether the bucket 17 has reached its dump position by monitoring the position of bucket 17 and determining whether it has been moved from its tool carry position. In another example, the controller 36 may monitor the boom lifting velocity and the boom swinging velocity to determine the rate of movement of the boom member 22. If the boom lifting velocity is less than a predetermined rate for a predetermined period of time and the boom swinging velocity is less than a predetermined rate for a predetermined period of time, the controller 36 may determine that the bucket 17 has reached its dump position. In other words, if the boom member 22 is not being moved upward and is not being swung for a predetermined time (e.g., one second), the controller 36 may determine that the bucket 17 has reached its dump position.

If the bucket 17 has not reached its dump position at decision stage 50, the controller 36 may continue to receive at stage 44 data from the sensors and additional data samples may be generated. If the bucket 17 has reached its dump position at decision stage 50, the controller 36 may determine at decision stage 51 whether a threshold number of data samples have been logged. The threshold number of data samples may be set based upon a desired confidence of the payload calculation process. In one example, the controller 36 may be configured to store or log data samples at stage 49 every twenty milliseconds. In other words, the controller 36 may execute stages 44 through 49 every twenty milliseconds. If a typical swing-to-dump segment takes approximately two to three seconds, the controller 36 may have as many as approximately one hundred to one hundred and fifty possible data samples. At decision stage 51, the controller 36 may be configured to require at least fifty data samples before an estimated payload may be stored at stage 57.

If a threshold number of data samples have not been logged at decision stage 51, the controller 36 may terminate the automatic payload calculation process as an insufficient number of data samples have been logged. The controller 36 may continue to receive data from sensors at stage 40. If a threshold number of data samples have been logged at decision stage 51, the controller 36 may determine at decision stage 52 whether the accuracy confidence function has logged more than a predetermined number of reduced confidence instances. If the number of reduced confidence instances exceeds a threshold or a predetermined number of instances, the controller 36 may generate a data accuracy warning signal and display a data accuracy warning message at stage 53.

At stage 54, the controller 36 may use the logged data samples to determine or calculate at stage 54 an estimate of the payload. In one embodiment, the controller 36 may utilize an optimization algorithm or routine such as least-squares to determine an estimate of the payload based upon operating characteristics of the machine 10. In another embodiment, the controller 36 may utilize data maps generated during a calibration procedure based upon one or more payloads to determine an estimate of the payload moved by the bucket 17. The controller 36 may display the estimate of the payload within the operator station 18 if desired.

At decision stage 55, an operator may provide a clear data command signal to clear the estimate of the payload from the current swing-to-dump segment. If the operator provides a clear data command signal to clear the estimate of the payload, the data log within the controller 36 may also be cleared of all data samples at stage 56. In such case, the payload control system 37 may begin collecting payload data again by receiving data from the sensors at stage 40.

In some instances, an operator may clear the payload estimate due to a warning from the accuracy confidence function. In other instances, an operator may be attempting to deliver to the target a predetermined amount of material in either one or a plurality of work cycles. In instances in which the amount of material loaded within bucket 17 exceeds a desired weight or mass, the operator may choose to return the material to the dig site 24, discard the payload estimate, and begin the digging operation again.

At stage 57, the controller 36 may store the calculated or estimated payload within controller 36. In addition, the payload may also be transmitted to other systems such as systems remote from machine 10 as desired.

INDUSTRIAL APPLICABILITY

The industrial applicability of the system for payload cycle detection described herein will be readily appreciated from the foregoing discussion. The present disclosure is applicable to many machines and tasks performed by machines. One exemplary machine for which the system for payload cycle detection is suited is an excavator. However, the system for payload cycle detection may be applicable to other machines and material handling systems that benefit from the calculation or estimation of a payload.

The disclosed system for payload cycle detection provides many advantages while operating material handling machines. The disclosed system may automatically detect the beginning and end of a segment of a work cycle during which a payload estimation process may be operated. More specifically, the disclosed system may monitor the operating parameters of the machine 10 and automatically determine when the payload estimation process may begin and end. In addition, based upon the operating parameters of the machine 10, the system may determine whether certain data generated by the payload estimation process is likely to be accurate, and discard such inaccurate data. Still further, the system may identify activities of an operator that may be modified to improve the accuracy of the payload estimation process.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:
1. A payload control system comprising:
a tool position sensor system configured to provide a tool position signal indicative of a position of a tool;
a boom lift sensor system configured to provide a boom lift signal indicative of a boom lifting velocity;
a boom swing sensor system configured to provide a boom swing signal indicative of a boom swinging velocity; and
a controller configured to:
receive the tool position signal;
receive the boom lift signal;
receive the boom swing signal;
determine a position of the tool based upon the tool position signal;
determine a boom lifting velocity based upon the boom lift signal;
determine a boom swinging velocity based upon the boom swing signal;
determine a beginning of a swing-to-dump segment of a work cycle of the tool based at least in part upon the tool being in a tool carry position, the boom lifting velocity exceeding a predetermined lift velocity, and the boom swinging velocity exceeding a predetermined swing velocity; and
determine a payload moved by the tool during the swing-to-dump segment of the work cycle.

2. The payload control system of claim 1, wherein the controller is configured to end the swing-to-dump segment of the work cycle upon either of: a) the tool being moved away from the tool carry position, and b) the boom lifting velocity being less than a predetermined rate for a predetermined period of time and the boom swinging velocity being less than a predetermined rate for a predetermined period of time.

3. The payload control system of claim 1, wherein the controller is configured to determine a plurality of tool position signals, boom lift signals, and boom swing signals during the swing-to-dump segment of the work cycle, each tool position signal, boom lift signal, and boom swing signal collectively defining a data sample.

4. The payload control system of claim 3, wherein the controller is configured to log a threshold number of data samples taken during the swing-to-dump segment of the work cycle.

5. The payload control system of claim 4, wherein the threshold number of data samples is approximately 50.

6. The payload control system of claim 4, wherein the controller is configured to generate a data accuracy warning signal based upon logging of a predetermined number of reduced confidence instances and discard the data samples for the work cycle based upon receipt of a command signal from an operator.

7. The payload control system of claim 3, wherein the controller logs a plurality of data samples during each swing-to-dump segment of the work cycle and uses an optimization algorithm on the threshold number of data samples upon completion of the swing-to-dump segment of the work cycle to calculate the payload.

8. The payload control system of claim 3, wherein the controller is further configured to determine a boom lifting acceleration and a boom swinging acceleration, and a data sample is rejected if one of the boom lifting acceleration and the boom swinging acceleration exceeds a respective predetermined rate.

9. The payload control system of claim 3, wherein the controller is further configured to determine a boom angle, and a data sample is rejected if the boom angle exceeds a predetermined angle.

10. A controller implemented method of determining a payload moved by a machine, comprising:
sensing whether a tool is in a tool carry position;
sensing a boom lifting velocity;
sensing a boom swinging velocity;
determining a beginning of a swing-to-dump segment of a work cycle of the tool based at least in part upon the tool being in the tool carry position, the boom lifting velocity exceeding a predetermined lift velocity, and the boom swinging velocity exceeding a predetermined swing velocity; and
determining a payload moved by the tool during the swing-to-dump segment of the work cycle.

11. The method of claim 10, further including ending the swing-to-dump segment of the work cycle upon either of: (a) the tool being moved from the tool carry position; and (b) the boom lifting velocity being less than a predetermined rate for a predetermined period of time and the boom swinging velocity being less than a predetermined rate for a predetermined period of time.

12. The method of claim 10, further including determining a plurality of tool position signals, boom lift signals, and boom swing signals during the swing-to-dump segment of the work cycle, each tool position signal, boom lift signal, and boom swing signal collectively defining a data sample.

13. The method of claim 12, further including averaging a threshold number of data samples taken during the swing-to-dump segment of the work cycle.

14. The method of claim 13, further including providing a warning signal to an operator, providing an operator command signal, and discarding payload measurement for a swing-to-dump segment of the work cycle.

15. The method of claim 12, further including logging a plurality of data samples during each swing-to-dump segment of the work cycle and using an optimization algorithm with the plurality of data samples to estimate a payload upon completion of the swing-to-dump segment of the work cycle.

16. A machine comprising:
a tool;
a linkage pivotally connected to the tool, the linkage including a boom member;
a tool position sensor system configured to provide a tool position signal indicative of a position of the tool;
a boom lift sensor system configured to provide a boom lift signal indicative of a boom lifting velocity;
a boom swing sensor system configured to provide a boom swing signal indicative of a boom swinging velocity; and
a controller configured to:
receive the tool position signal;
receive the boom lift signal;
receive the boom swing signal;
determine a position of the tool based upon the tool position signal;
determine a boom lifting velocity based upon the boom lift signal;
determine a boom swinging velocity based upon the boom swing signal;
determine a beginning of a swing-to-dump segment of the work cycle of the tool based at least in part upon the tool being in a tool carry position, the boom lifting velocity exceeding a predetermined lift velocity, and the boom swinging velocity exceeding a predetermined swing velocity; and
determine a payload moved by the tool during the swing-to-dump segment of the work cycle.

* * * * *